United States Patent [19]
Garcia

[11] Patent Number: 5,115,595
[45] Date of Patent: May 26, 1992

[54] RODENT TRAP

[76] Inventor: Alfonso M. Garcia, 331 College Ave., Vallejo, Calif. 94589

[21] Appl. No.: 714,555

[22] Filed: Jun. 13, 1991

[51] Int. Cl.⁵ .......................................... A01M 23/02
[52] U.S. Cl. .......................................... 43/61; 43/69; 43/71
[58] Field of Search ................... 43/60, 61, 62, 67, 69, 43/70, 71, 72, 74

[56]       References Cited
       U.S. PATENT DOCUMENTS

| | | | |
|---|---|---|---|
| 212,151 | 2/1879 | Neal | 43/67 |
| 1,102,896 | 7/1914 | Fischer | 43/67 |
| 1,347,130 | 7/1920 | Stevenson | 43/67 |
| 1,948,601 | 2/1934 | Thomas | 43/69 |
| 2,850,835 | 9/1958 | Scheidegger | 43/70 |
| 4,241,531 | 12/1980 | Nelson et al. | 43/69 |
| 4,748,766 | 6/1988 | Stimac | 43/69 |
| 4,829,701 | 5/1989 | ImBrogno | 43/67 |

Primary Examiner—Richard K. Seidel
Assistant Examiner—Chuck Y. Mah
Attorney, Agent, or Firm—Leon Gilden

[57]                ABSTRACT

A rodent trap includes a housing defined by a rectilinear framework, including a floor, spaced side walls, and a rear wall, with a top wall defined by a pivotally mounted door permitting access to contents of the container. A "U" shaped handle member is mounted to an upper terminal end of frontal frame legs, wherein a medial "U" shaped frame member pivotally mounts a trap door therebetween. The trap door is pivotally mounted medially of its length, whereupon a rodent tempted forwardly by bait along the trap door effects pivotment of the trap door and its closure of the front wall of the trap structure.

5 Claims, 4 Drawing Sheets

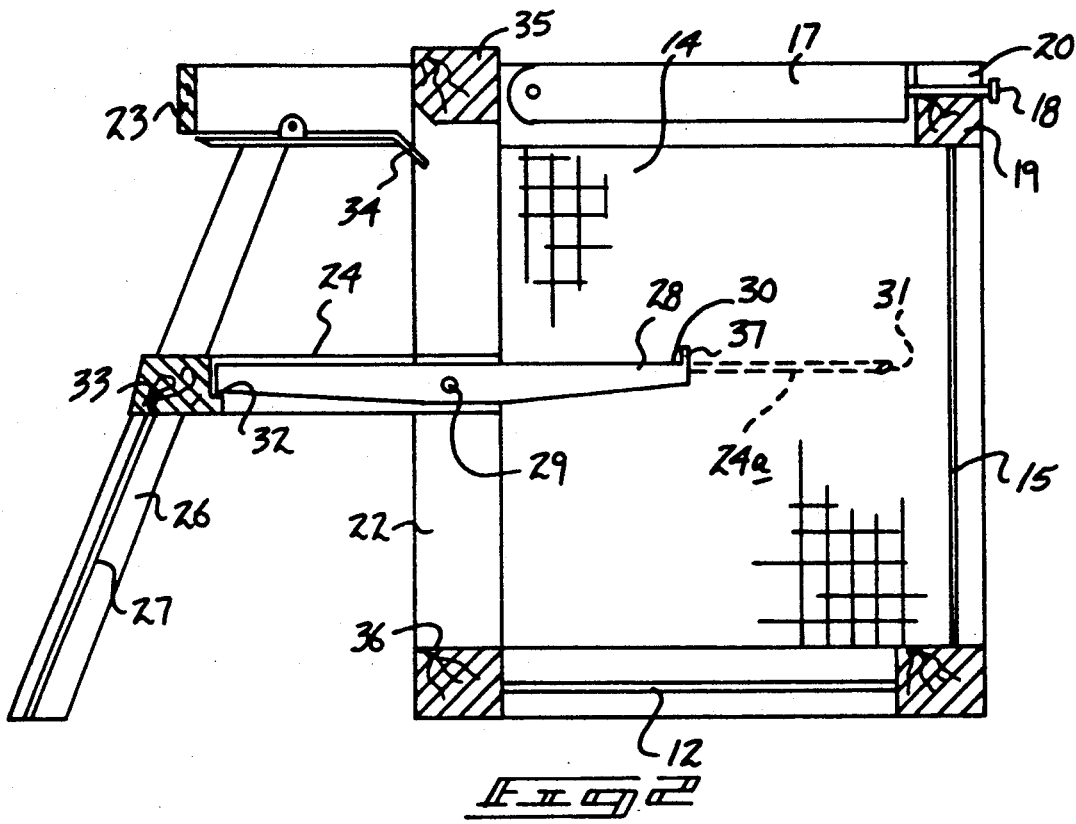
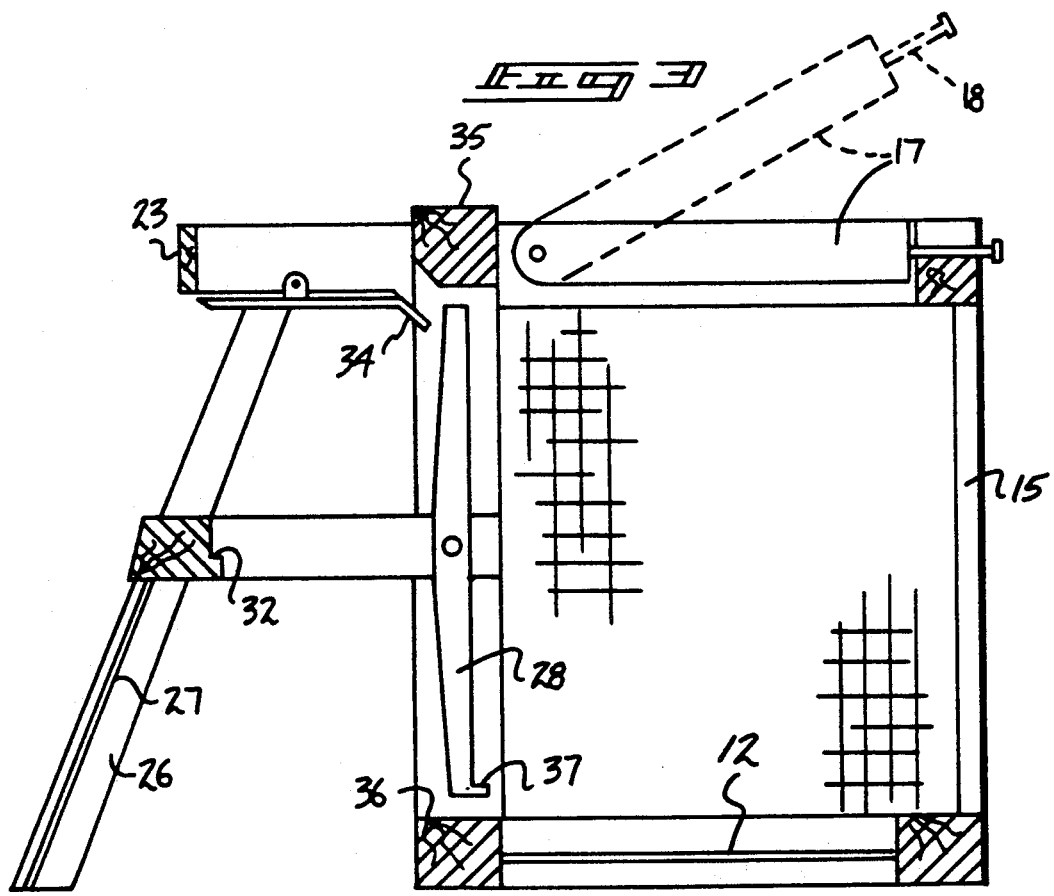

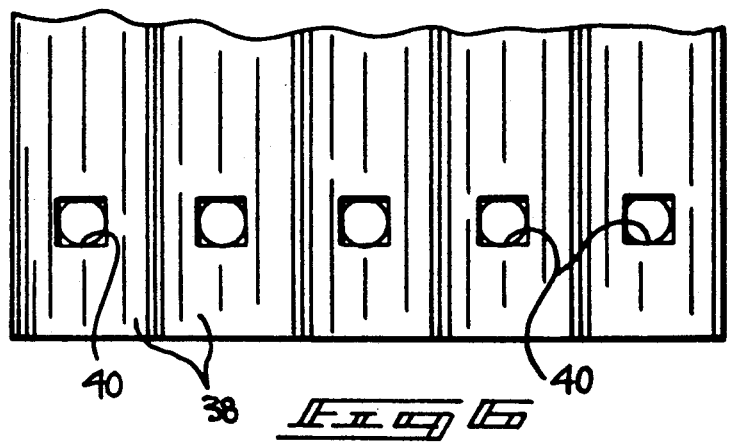
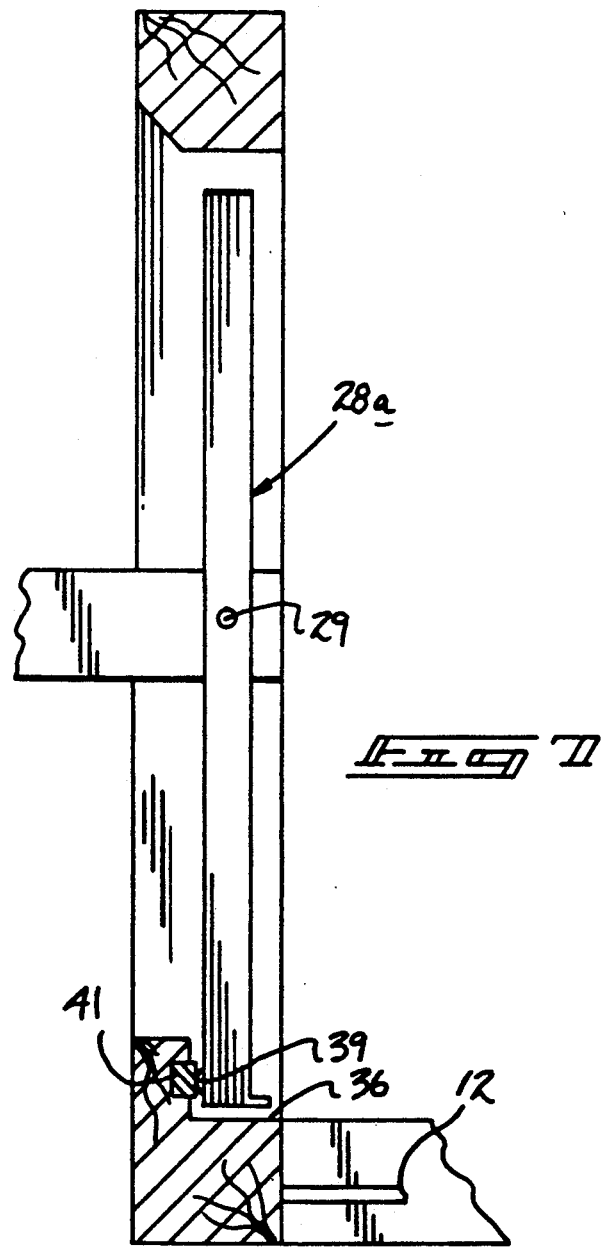

RODENT TRAP

BACKGROUND OF THE INVENTION

1. Field of the Invention

The field of invention relates to mouse trap and rodent trap structure, and more particularly pertains to a new and improved rodent trap wherein the same provides for the containment and capture of a rodent therewithin.

2. Description of the Prior Art

Mouse trap structure of various types has been utilized in the prior art, wherein typically the traps must be emptied with associated inconvenience. The invention of the instant application attempts to overcome deficiencies of the prior art by providing a trap housing, wherein the same utilizes open mesh side walls wherein capture of a rodent therewithin permits subsequent release or sanitary disposal of rodents contained therewithin.

Examples of prior art trap structure is exemplified and found in U.S. Pat. No. 4,829,700 to Ha wherein an elongate transparent trap member utilizes spring door at an entrance thereof to trap a rodent therewithin.

U.S. Pat. No. 4,310,984 to Brubaker, Jr. sets forth a rodent and animal trap wherein a weighted door is vertically reciprocatable within a forward wall of the trap structure.

U.S. Pat. No. 3,975,857 to Branson, et al. wherein a rodent trap includes a frontal door that is biased to a closed position to overlie an entrance thereof upon a rodent mounting a plate member positioned on the floor of the trap structure.

U.S. Pat. No. 4,682,440 to Hunter sets forth an animal trap wherein the same effects closure of a forwardly mounted pivotal door arranged to overlie a forward entrance of the trap structure.

As such, it may be appreciated that there continues to be a need for a new and improved rodent trap as set forth by the instant invention which addresses both the problems of ease of use as well as effectiveness in construction in eliminating requirements of springs and the like in the setting of the trap structure and in this respect, the present invention substantially fulfills this need.

SUMMARY OF THE INVENTION

In view of the foregoing disadvantages inherent in the known types of rodent trap apparatus now present in the prior art, the present invention provides a rodent trap wherein the same utilizes a pivotally mounted trap door to effect closure of a forward entrance of the trap opening minimizing use of springs and other precariously mounted structure. As such, the general purpose of the present invention, which will be described subsequently in greater detail, is to provide a new and improved rodent trap which has all the advantages of the prior art rodent traps and none of the disadvantages.

To attain this, the present invention provides a rodent trap including a housing defined by a rectilinear framework, including a floor, spaced side walls, and a rear wall, with a top wall defined by a pivotally mounted door permitting access to contents of the container. A "U" shaped handle member is mounted to an upper terminal end of frontal frame legs, wherein a medial "U" shaped frame member pivotally mounts a trap door therebetween. The trap door is pivotally mounted medially of its length, whereupon a rodent tempted forwardly of bait along the trap door effects pivotment of the trap door and its closure of the front wall of the trap structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved rodent trap which has all the advantages of the prior art rodent traps and none of the disadvantages.

It is another object of the present invention to provide a new and improved rodent trap which may be easily and efficiently manufactured and marketed.

It is a further object of the present invention to provide a new and improved rodent trap which is of a durable and reliable construction.

An even further object of the present invention is to provide a new and improved rodent trap which is susceptible of a low cost of manufacture with regard to both materials and labor, and which accordingly is then susceptible of low prices of sale to the consuming public, thereby making such rodent trap economically available to the buying public.

Still yet another object of the present invention is to provide a new and improved rodent trap which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an orthographic side view, taken in cross-section of the invention, in a first position of the trap door.

FIG. 3 is an orthographic cross-sectional illustration of the invention in a second position of the trap door.

FIG. 6 is an orthographic view, taken along the lines 6—6 of FIG. 4 in the direction indicated by the arrows.

FIG. 7 is an orthographic view, taken along the lines 7—7 of FIG. 4 in the direction indicated by the arrows.

DESCRIPTION OF THE PREFERRED EMBODIMENT

Figure 1:
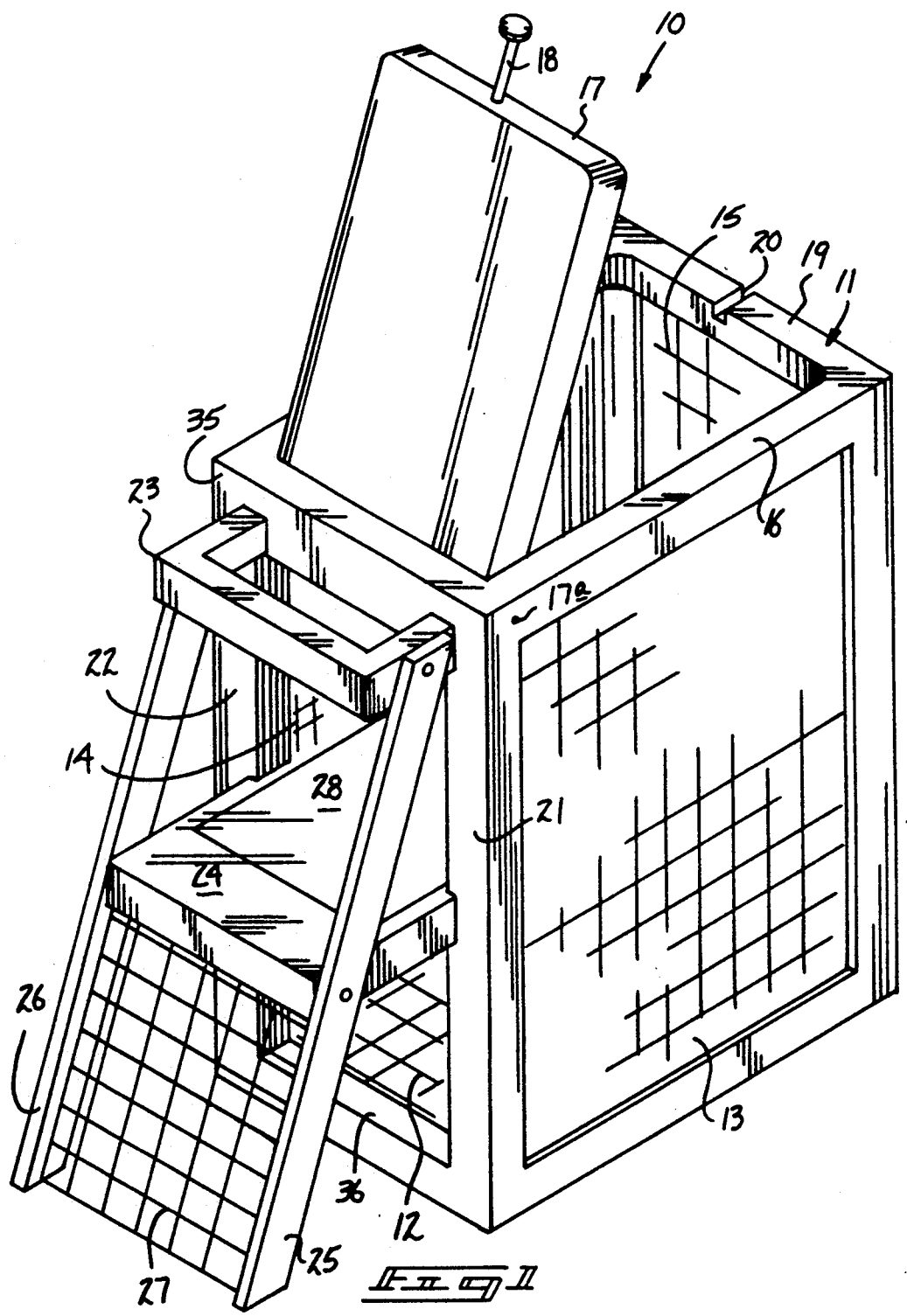
FIG. 1 is an isometric illustration of the instant invention.
Figure 4:
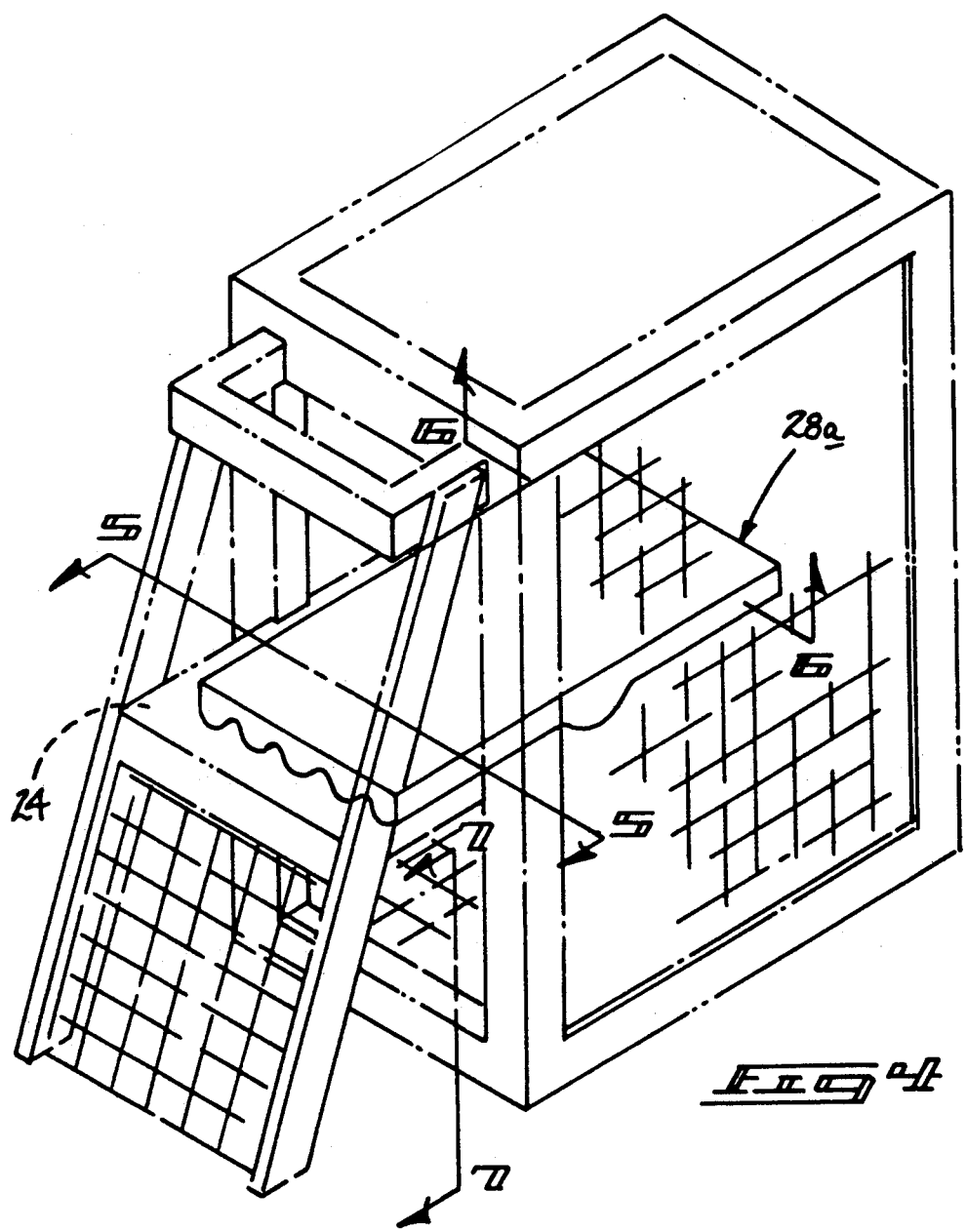
FIG. 4 is an isometric illustration of a modification of the trap door structure of the instant invention.
Figure 5:
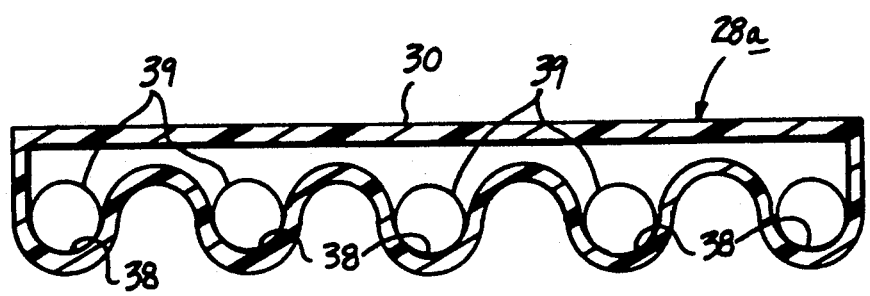
FIG. 5 is an orthographic view, taken along the lines 5—5 of FIG. 4 in the direction indicated by the arrows.

With reference now to the drawings, and in particular to FIGS. 1 to 7 thereof, a new and improved rodent trap embodying the principles and concepts of the present invention and generally designated by the reference numeral 10 will be described.

More specifically, the rodent trap 10 of the instant invention essentially comprises a housing 11 defined by a rectilinear framework, including a mesh floor 12, a mesh right side wall 13, a mesh left side wall 14, and a mesh rear wall 15, with the housing 11 including an entrance opening defined by a frontal framework that includes a right frontal frame leg 21, a left frontal frame leg 22, a frontal frame bottom leg 36, and a frontal frame top leg 35.

An access door 17 is pivotally mounted within a rectilinear top frame 16 that is orthogonally oriented relative to the frontal framework that includes a door axle 17a pivotally mounting the access door 17 within the rectilinear top frame 16. The door 17 includes an abutment rod 18 projecting exteriorly thereof and received within a slot 20 formed within a top frame rear leg 19. The rod 18 projects exteriorly of the top frame rear leg 19 to permit manual grasping of the rod 18 to effect opening of the door as required to gain access to contents therewithin.

A "U" shaped handle member 23 is orthogonally mounted to upper terminal ends of the right and left frontal frame legs 21 and 22 respectively. A medially positioned "U" shaped support is orthogonally mounted to the right and left frontal frame legs 21 and 22 projecting exteriorly of the right and left frontal frame legs 21 and 22 and mounted medially therebetween. A trap door member 28 is pivotally mounted between side legs of the "U" shaped support 24 medially of the trap door member 28 length.

A right and left respective leg member 25 and 26 are mounted to the handle member 23 and "U" shaped support 24, wherein an upper terminal end of the leg members 25 and 26 are mounted to the "U" shaped handle member 23 and extend downwardly and secured to a forward terminal end of a "U" shaped support 24. A ladder mesh 27 is coextensively positioned between the right and left leg members 25 and 26 between a lower terminal end of each of the leg members 25 and 26 and the "U" shaped support 24 to permit a rodent and like to gain access to the "U" shaped support 24 and associated trap door member 28 by climbing the ladder mesh 27. Reference to FIGS. 2 and 3 illustrate that a bait mounting projection 37 formed to a forward terminal end of the ladder member 28 attracts a rodent therealong, whereupon as the rodent transverse a path from a rear portion of the trap door 20 to a forward portion thereof, the trap door rotates from a first horizontal position to a second vertical position, wherein the rear terminal end of the trap door 28 passes beyond a latch plate 34 that projects within the forward opening defined by the forward framework. When in the first position, the rear terminal end of the trap door 28 rests upon a trap door support lip 32, but when rotated into the second position is latched therein by its projection beyond the latch plate 34. Further, the trap door member's top surface 30 is tilted upwardly beyond a horizontal plane 24a to define an acute angle to normally tilt the door rearwardly prior to an animal gaining access to a forward portion thereof beyond the trap door axle 29 that is mounted medially of the trap door and orthogonally into the "U" shaped support legs.

A modified trap door member 28a, as illustrated in FIGS. 4–7, includes a plurality of parallel tracks 38 that are coextensively formed within the modified trap door 28a, wherein each of the tracks includes a spherical weight member 39. A track window 40 is formed through a bottom surface of the trap door adjacent the forward terminal end thereof to permit magnetic communication between a ferromagnetic strip 41 mounted within the frontal door frame's bottom leg 36, whereupon as the trap door 28a is rotated to a vertical position, the magnetic strip 41 effects attraction to the spherical weight members 39 to maintain the trap door in the vertical orientation, as illustrated for example in FIG. 7. Normally, the spherical weight members 39 are arranged to provide a slight tilting of the trap door into abutment with the trap door support lip 32, in a manner as illustrated in FIG. 2.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rodent trap, comprising, a housing, the housing including a mesh floor, a mesh right side wall, a mesh left side wall, and a mesh rear wall, the housing further including a rectilinear front frame and a rectilinear top frame, the rectilinear front frame including a front opening coextensively formed within the front frame, and a rectilinear top frame including an access door pivotally mounted within the top frame, the access door including a door axle directed into the top frame, with the top frame including a top frame rear leg, the access door including an access door rear edge, and an abutment rod extending beyond the access door mounted to the access door rear edge, and the top frame rear leg including a slot, the abutment rod received within the slot in a first position, with the abutment rod extending beyond the slot and the rear wall for manual grasping of the rod to permit lifting of the access door relative to the top frame, and the front frame including a trap door mounted within the front frame, the trap door pivotal from a first horizontal position permitting access of a rodent to the trap door to a second position, wherein the trap door is arranged in a vertical orientation within the front frame opening.

2. A rodent trap as set forth in claim 1 wherein the front frame includes a right frontal frame leg spaced from and parallel a left frontal frame leg, and a frontal frame bottom leg coextensive with the mesh floor, and a frontal frame top leg coextensive with the top frame, and a "U" shaped handle member fixedly and orthogonally mounted to an upper terminal end of the right frontal frame leg and the left frontal frame leg, and a "U" shaped support mounted below and parallel the "U" shaped handle and fixedly secured within the frontal frame to the right frontal frame leg and the left frontal frame leg medially of the right frontal frame leg and the left frontal frame leg between the frontal frame bottom leg and the frontal frame top leg, and the "U" shaped support rotatably mounting the trap door member therewithin.

3. A rodent trap as set forth in claim 2 wherein the "U" shaped support includes a support lip, the support lip mounting a forward edge of the trap door member when the trap door is in a first horizontal position, and a latch plate mounted adjacent the frontal frame top leg to abut a bottom surface of the trap door member and maintain the trap door member in the second vertical position when the trap door member is rotated to the second vertical position.

4. A rodent trap as set forth in claim 3 further including a right leg member and a left leg member, the right leg member including an upper terminal end mounted to the "U" shaped handle member and to the "U" shaped support extending downwardly from the "U" shaped support in alignment with the frontal frame bottom leg, and the left leg member mounted to the "U" shaped handle members spaced from and parallel the right leg member and mounted to the "U" shaped support extending downwardly to the frontal frame bottom leg coextensive therewith, wherein the right leg member and the left leg member are coextensive relative to one another, and including a ladder mesh coextensively mounted between the right leg member and left leg member between a lower terminal end of the right leg member and the left leg member and the "U" shaped support to permit access of a rodent to the "U" shaped support.

5. A rodent trap as set forth in claim 4 wherein the trap door member includes an interior cavity, the interior cavity includes a plurality of parallel tracks contained therewithin, and each parallel track includes a spherical weight member rotatably mounted within each track, and the trap door includes a trap door window positioned adjacent a rear edge of the trap door through a bottom surface of the trap door, and the frontal frame bottom leg includes a ferromagnetic strip, wherein the ferromagnetic strip is in magnetic engagement with each spherical weight member through a respective track window when the trap door member is in the vertical second position.

* * * * *